Oct. 6, 1964

W. CULL 3,151,473

UNIVERSAL JOINTS

Filed Dec. 10, 1962

INVENTOR
WILLIAM CULL
BY *Irwin S. Thompson*

ATTORNEY

United States Patent Office 3,151,473
Patented Oct. 6, 1964

3,151,473
UNIVERSAL JOINTS
William Cull, Hest Bank, near Lancaster, England, assignor to Birfield Engineering Limited, London, England
Filed Dec. 10, 1962, Ser. No. 243,368
Claims priority, application Great Britain, Dec. 12, 1961, 44,423/61
10 Claims. (Cl. 64—8)

This invention relates to universal joints of the constant velocity variety.

Universal joints of the constant velocity variety normally comprise driving and driven members coupled by an intermediate torque transmitting member or members. Guide means are commonly provided to maintain the intermediate member or members in the medium plane of the joint at all joint angles, that is the plane passing through the joint centre and bisecting the angle between the axes of the driving and driven members. This is a necessary condition if the joint is to have true (or substantially true) constant velocity characteristics, and the object of the invention is to provide a universal joint of the constant velocity type with improved guide means for the intermediate member or members.

A universal joint according to the invention comprises grooved inner and outer members coupled by an intermediate member or members engaging corresponding grooves in the inner and outer members, a control member which engages the intermediate member or members and a guide member which passes through and engages the control member to position the latter correctly, the guide member having an end which seats in the inner member and an opposite end face which for all joint angles engages an abutment surface fixed relatively to the joint centre, the guide member being constrained to rock about said opposite end. The joint centre is the point about which relative angularity of the inner and outer members is centred, and the inner and outer members can alternatively form the driving and driven members of the joint.

A plurality of balls arranged in an equiangularly spaced series preferably form the intermediate members, and the control member may then be a ball cage which is conveniently split for assembly around the inner member. The inner member may be centred by engagement within the cage, the cage being in turn accurately centred about the joint centre within the outer member.

The guide member may have a smaller ball end seated in a part-spherical seating in the inner end of the inner member, and a larger diameter opposite ball end which moves within a cylindrical housing to provide the constraint for rocking movement of the guide member. This larger diameter ball end is then of truncated form to provide said opposite end face which is suitably contoured to provide the necessary permanent engagement with said abutment surface. The latter surface is conveniently flat, in which case said end face may be generally part-spherical and of relatively large diameter as compared with the length of the guide member.

The guide member preferably has an intermediate bulbous portion with a part-spherical outer surface which engages a control bore in the cage through which the guide member passes, such engagement acting to displace the cage to control the ball position on rocking movement of the guide member.

The invention will now be further described with reference to the accompanying drawings which illustrate, by way of example, one form of constant velocity joint in accordance with the invention. In the drawings.

Figure 1:
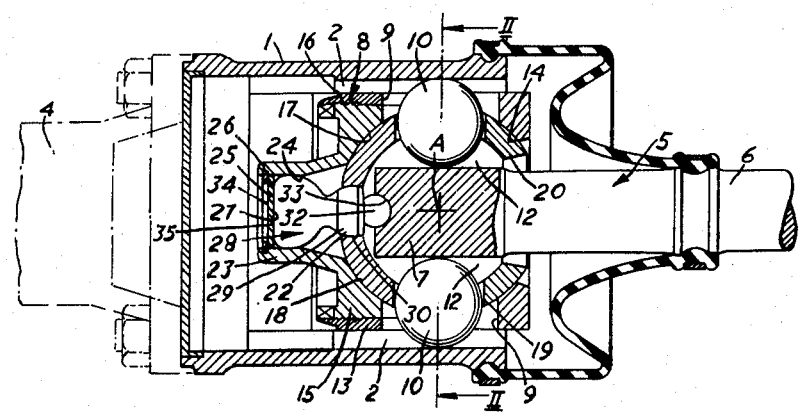
FIGURE 1 is an axial sectional view of the joint.
Figure 2:
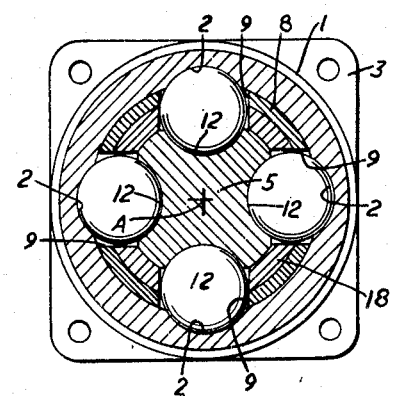
FIGURE 2 is a lateral sectional view on the line II—II in FIGURE 1.

The illustrated joint is capable of accommodating "plunge," i.e. relative axial movement of shafts coupled by the joint.

A hollow generally cylindrical outer member 1 is formed internally with four longitudinally extending grooves 2. At one end the outer member 1 is formed with a flange 3 for bolting to a flanged shaft such as shown in broken lines at 4, and a ball-ended inner member 5 has a shaft portion 6 which projects from the other or open end of the outer member 1. The ball end 7 of the inner member is centred within a carrier member 8 which slides in a piston-like manner within the outer member 1 to accommodate plunge. The carrier member 8 has a side wall with four through apertures 9 within which are positioned equiangularly arranged intermediate members 10 in the form of torque-transmitting balls, each of these balls engaging one of the four grooves 2 in the outer member 1 and a corresponding groove 12 in the ball end 7 of the inner member 5.

The carrier member 8 is formed in two parts, a main part 13 which is bored cylindrical for part of its length terminating at a part-spherical seating 14 at the outer end, and an end part 15 which is threaded into the inner end of the other part 13 at 16 and is formed within an opposed part-spherical seating 17. A ball cage 18 of generally spherical shape forms a ball control member and closely embraces the ball end 7 of the inner member 5 to centre the latter within the cage 18. The cage 18 has an outer surface 19 which seats in the opposed part-spherical seatings 14 and 17 to centre the cage 18 itself relatively to the joint axis within the carrier member 8.

The cage 18 is for assembly purposes split in the lateral plane containing the centres of the coupling balls 10, and it has an aperture 20 through which the inner member shaft portion 6 passes with clearance and a diametrically opposed guide bore 22 the purpose of which will be described hereinafter.

The end part 15 of the carrier member 8 is provided with a cylindrical inwardly directed extension 23 having a bore 24 which tapers for approximately half its length and is thereafter cylindrical. The end of the bore 24 is closed by a plate 25 held in position within the extension 23 by a circlip 26 and the plate 25 presents a plane abutment surface 27 facing towards the inner member 5.

A guide member 28 which passes through the guide bore 22 has an intermediate bulbous portion 29 with a part-spherical surface 30 which is positioned within and engages the guide bore 22. The guide member 28 has a smaller diameter inner ball end 32 which engages a part-spherical seating 33 in the inner end of the inner member 5 and a larger diameter ball end 34 which is a fit within the housing provided by the cylindrical portion of the bore 24. The bore 24 constrains the larger diameter end 34 of the member 28 so that changing angularity of the joint produces rocking movement of the member 28 about that end.

As a result of such rocking movement the guide member 28 engages the guide bore 22 to produce controlled movement of the cage 18 such that the plane of the torque-transmitting ball centres remains substantially coincident with the median plane of the joint. Between the bulbous section 29 of the guide member 28 and each of the ball ends 32 and 34 thereof that member has as shown reduced neck portions which provide adequate clearance for the guide member 28 throughout the full range of joint angularity; the tapering section of the bore 24 in the extension 23 also provides clearance for this purpose.

The convex end face 35 of the guide member is so formed that for all joint angles it engages the plane abutment surface 27 which is fixed relatively to the joint centre (indicated at A in the drawings), the form of the end face 35 being chosen so that the effective length of the guide member 28 increases in the required manner as the joint angle increases to retain correct seating of the end 32 in the inner member 5. The end face 35 is in fact part-spherical and the exact position of the centre of this face is determined by calculation for each particular joint construction. It will be appreciated that the centre of the smaller ball end 32 of the guide member 28 moves relatively to the carrier member 8 in an arc centred on the joint centre as the joint angle changes, so that the centre of the larger ball end 34 has to move along the axis of the carrier member 8 away from the fixed abutment surface 27. To compensate for this the part-spherical end face 35 has to be of a radius greater than the distance from the abutment surface 27 to the joint centre A, and as already mentioned the exact position of the centre of the face 35 is determined by calculation.

The ball tracks or grooves 12 in the inner member 5 are of elliptical cross-section, the grooves 2 in the outer member 1 being relatively shallow but of similar cross-sectional shape. The form of the grooves 2 and 12 is chosen to provide a pressure angle of 45°, this being the angle at the centre of each torque-transmitting ball 10 between a radius, through either of the two areas of contact of the ball with the flanks of each corresponding groove 2 or 12, and a line through the ball centre and tangential to the pitch circle of the balls.

I claim:

1. A universal joint comprising inner and outer members having cooperating grooves, intermediate rolling members engaging corresponding grooves in the inner and outer members, a control member which engages the intermediate members to position them in a common plane, an abutment member connected to the inner member, and having an abutment surface located at a fixed distance from the joint centre of said inner member, and a guide member which passes through and engages the control member to position the latter correctly, the guide member having an end which seats in the inner member and an opposite end face which has a curvature differing from that of said abutment surface, and rocks thereon, and provides an effective length of the guide member which increases as the joint angle increases, so that for all joint angles the said end face engages the abutment surface fixed relatively to the joint centre.

2. A universal joint according to claim 1, wherein the control member is a thin walled part-spherical ball cage, having apertures in which the rolling members are located.

3. A universal joint according to claim 1, wherein the end of the guide member which seats in the inner member is a part-spherical ball end seating in a corresponding part-spherical seating fixed in the inner member, and the opposite end surface of the guide member has a diameter greater than that of the said ball end.

4. A universal joint according to claim 1, wherein said abutment surface is a flat planar surface and said end face is generally part-spherical and has a radius of curvature which is greater than the length of the guide member.

5. A universal joint according to claim 1, wherein the guide member has an intermediate bulbous portion with a part-spherical outer surface which engages a control bore in the control member through which the guide member passes.

6. A universal joint according to claim 1, wherein the joint is capable of accommodating plunge and the grooves in the outer member are parallel with one another and with the axis of the outer member, so that the rolling elements can move axially relative thereto.

7. A universal joint according to claim 6, including a carrier member which is axially slidable in said outer member and has surfaces which engage and locate the control member axially.

8. A universal joint according to claim 7, in which said abutment member is secured to said carrier member.

9. A universal joint comprising inner and outer members having cooperating grooves, intermediate rolling members engaging corresponding grooves in the inner and outer members, a control member which engages the intermediate members to position them in a common plane, an abutment member connected to the inner member, and having an abutment surface located at a fixed distance from the joint centre of said inner member, and a guide member which passes through and engages the control member to position the latter correctly, the guide member having one part-spherical ball end which seats in a corresponding part-spherical seating fixed relative to the inner member, and an opposite end face which has a radius of curvature greater than the length of the guide member, and rocks on said flat planar abutment surface of said abutment member.

10. A universal joint comprising inner and outer members having cooperating grooves, intermediate rolling members engaging corresponding grooves in the inner and outer members, a control member which engages the intermediate members to position them in a common plane, an abutment member connected to the inner member, and having an abutment surface located at a fixed distance from the joint centre of said inner member, and a guide member which passes through and engages the control member to position the latter correctly, the guide member having one part-spherical ball end which seats in a corresponding part-spherical seating fixed relative to the inner member, and an opposite end face which has a radius of curvature greater than the length of the guide member and barrel shaped side surfaces which engage the internal side wall of a cylindrical housing secured to the abutment member.

References Cited in the file of this patent
UNITED STATES PATENTS

| | | |
|---|---|---|
| 2,352,776 | Dodge | July 4, 1944 |
| 2,911,805 | Wildhaber | Nov. 10, 1959 |
| 3,041,858 | Wildhaber | July 3, 1962 |